(12) United States Patent
Kakizaki

(10) Patent No.: US 6,584,131 B1
(45) Date of Patent: Jun. 24, 2003

(54) ARF EXCIMER LASER DEVICE FOR EXPOSURE

(75) Inventor: Koji Kakizaki, Mishima (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 236 days.

(21) Appl. No.: 09/680,325

(22) Filed: Oct. 6, 2000

(30) Foreign Application Priority Data

Oct. 8, 1999 (JP) ............................................ 11-288152

(51) Int. Cl.$^7$ ................................................ H01S 3/22
(52) U.S. Cl. ............................. 372/57; 372/58; 372/60
(58) Field of Search ............................. 372/57, 58, 60

(56) References Cited

U.S. PATENT DOCUMENTS

| | | | |
|---|---|---|---|
| 4,977,573 A | * 12/1990 | Bittenson et al. | 372/58 |
| 5,260,961 A | * 11/1993 | Zhou et al. | 372/57 |
| 6,014,398 A | 1/2000 | Hofmann et al. | |
| 6,157,662 A | * 12/2000 | Scaggs et al. | 372/60 |
| 6,240,112 B1 | * 5/2001 | Partlo et al. | 372/57 |
| 6,466,599 B1 | * 10/2002 | Bragin et al. | 372/3.58 |
| 6,496,527 B1 | * 12/2002 | Terashima et al. | 372/60 |
| 2001/0009559 A1 | * 7/2001 | Tada et al. | 372/57 |
| 2001/0028664 A1 | * 10/2001 | Vogler et al. | 372/55 |
| 2002/0101900 A1 | * 8/2002 | Govorkov et al | 372/57 |
| 2002/0105995 A1 | * 8/2002 | Govorkov et al. | 372/57 |
| 2002/0186741 A1 | * 12/2002 | Kleinschmidt et al. | 372/57 |

FOREIGN PATENT DOCUMENTS

| | | |
|---|---|---|
| EP | 1 085 623 | 3/2001 |
| EP | 1091462 A2 | * 11/2001 |
| JP | 63-110780 | 5/1988 |
| JP | 1-58968 | 4/1989 |
| JP | 5-82879 | 4/1993 |
| JP | 6-97550 | 4/1994 |
| JP | 11-191660 | 7/1999 |
| JP | 2001-156367 | 6/2001 |

OTHER PUBLICATIONS

Mituo Maeda, "Excimer Laser", pp. 62–65, Aug. 20, 1993, (with English abstract).

Performance Characteristics of Ultra–Narrow ArF Laser For DUV Lithography, Alex Ershov et al., Cymer Inc., Part of the SPIE Conference on Optical Microlithography XII, Santa Clara, CA, Mar. 1999, pps. 1030–1037.

* cited by examiner

*Primary Examiner*—Leon Scott, Jr.
(74) *Attorney, Agent, or Firm*—Nixon Peabody LLP; David S. Safran

(57) ABSTRACT

An ArF excimer laser device for performing an oscillating operation with a repetition rate of more than 3 kHz and an oscillating laser pulse width ($T_{is}$) of more than 30 ns. The laser operation is carried out in an initial half-period of an electrical discharge oscillating current waveform of a pulse of reversed polarity generated by a high voltage pulse generating device and in at least two subsequent half-periods. The pressure of the laser gas in the laser chamber is 2.5 to 3.5 atm, the fluorine concentration is 0.12% or less, and the argon gas concentration 3% or less. As a result, the laser pulse width ($T_{is}$) can be set to more than 30 ns.

3 Claims, 4 Drawing Sheets

ARF EXCIMER LASER DEVICE FOR EXPOSURE

BACKGROUND OF THE INVENTION

1. Field of the Invention

This invention relates to an ArF excimer laser device for exposure, and more particularly, an ArF excimer laser device for exposure in which a laser operation having a long laser pulse width is carried out.

2. Description of the Related Art

In order to obtain a fine formation and a high degree of integration of a semiconductor integrated circuit, it is necessary to improve the high-resolution capacity in a projection-type exposure device. Accordingly, a short wavelength of exposure light radiated from an exposure light source was promoted, and an ArF excimer laser device has effectively been applied as a next-generation semiconductor exposure light source.

In the ArF excimer laser device, an electrical discharge is generated within the laser chamber in which laser gas, a gas mixture comprised of rare gases such as argon (Ar) gas and neon (Ne) acting as a buffer gas and fluorine ($F_2$) gas or the like, is hermetically enclosed at several 100 kPa, and the laser gas acting as laser medium is excited.

Since the spectral width of the laser beam in the ArF excimer laser device is wide enough to have a value of about 400 pm, it becomes necessary to obtain a narrow band formation of the spectral width of less than 1 pm in order to avoid the problem of a chromatic aberration in the projection optical system of the exposure device. The narrow band formation of the spectral line width is realized, for example, by arranging a narrow band formation optical system comprised of a beam enlargement prism and a refraction grating within the laser resonator.

However, the ArF excimer laser device is made such that the main oscillating wavelength is 193.3 nm which is shorter than the main oscillating wavelength of 248 nm of a KrF excimer laser device which is presently commonly used as a light source for exposure. Due to this fact, damage to the crystal acting as the glass material used in a projection lens system of the exposure device, such as a stepper and the like, is high as compared with when a KrF excimer laser device is used, and so the problem of a short lifetime of the lens system arises.

There are generally two types of crystal damage, namely, the formation of a colored spot caused by absorption of two photons and a compaction (an increased refractive index). The former may become apparent in the reduction of the transmission factor, the latter in a reduction of the resolution of the lens system. This influence is inverse proportional to the laser pulse width $T_{is}$ defined by the following equation, provided that the energy of the laser pulse is kept constant:

$$T_{is}=(\int T(t)dt)^2/\int (T(t))^2 dt \qquad (1)$$

where T(t) is the time-dependent laser shape.

In the following, the definition of this laser pulse width $T_{is}$ will be described. If it is assumed that the damage of the optical element is generated by absorption of two photons, the damage is proportional to the square of the intensity, so that a damage D accumulated per one pulse is given by the following equation:

$$D=k\int (P(t))^2 dt \qquad (2)$$

where k is a material constant and P(t) is the time-dependent laser intensity (MW).

The laser intensity P(t) can be divided into time and energy according to the following equation:

$$P(t)=I \cdot T(t)/\int T(t')dt' \qquad (3)$$

where I is the energy (mJ) and T(t) is the time-dependent laser shape.

When P(t) is integrated on a time-basis to obtain I, and in case where an ArF excimer laser (to be described later) is used for exposure, the value of I is 5 mJ.

In this case, when the equation (3) is combined with the equation (2), the damage D is expressed by the following equation:

$$D=k \cdot I^2 \int (T(t)/\int T(t')dt')^2 dt = k \cdot I^2 \int (T(t))^2 dt/(\int T(t)dt)^2 \qquad (4)$$

And combination with equation (1) leads to $$D=k \cdot I^2/T_{is} \qquad (5)$$

From this equation (5), since $k \cdot I^2$ is kept constant (I is kept constant), the pulse width $T_{is}$, in inverse proportion to the damage D, is defined by the equation (1).

This laser pulse width may reflect an actual pulse width, and when the pulse width is kept the same, the value of $T_{is}$ is extended until it approximately has a rectangular shape.

The narrow band ArF excimer laser device for exposure that is now available on the market is generally applied such that the repetition rate of the oscillating operation (hereinafter called a repetition rate) is 1 kHz and the laser beam output is 5 W. It is necessary to obtain a laser pulse width $T_{is}$ of 30 ns or more in order to avoid damage to the optical system installed in the exposure device.

As described above, in order to reduce the damage to the optical system, it is required to extend the laser pulse width $T_{is}$ (long pulse generation), although this long pulse generation is also required in view of the following points.

In the projection exposure device, the resolution R of an image projected onto a workpiece, such as a wafer coated with a photoresist, through a projection lens and the focusing depth DOF are expressed by the following equations:

$$R=k_1 \cdot \lambda/NA \qquad (6)$$

$$DOF=k_2 \cdot \lambda/(NA)^2 \qquad (7)$$

where $k_1$ and $k_2$ are coefficients reflecting characteristics of the resist and the like, $\lambda$ is the wavelength of the exposure light radiated from the exposure light source and NA is the number of apertures.

In order to improve the resolution R, as apparent from the equation (6), the wavelength of the exposure light has to be short and a high NA value is desirable; although, correspondingly, as indicated in the equation (7), the focusing depth DOF is reduced. Due to this fact, since the chromatic aberration is strongly influenced, it is necessary to narrow the spectral line width of the exposure light. That is, it is further required to achieve a narrower band formation of the spectral line width of the laser light radiated from the ArF excimer laser device.

Proc.SPIE Vol.3679 (1999) pp.1030 to 1037 describes that, when the laser pulse width is extended, the spectral line width of the laser beam is narrowed, and actually, the experiments performed by the present inventor proved this fact. That is, in order to improve the resolution R, it is further required to narrow the band formation of the spectral line width of the laser beam, and so it is required to have a long pulse generation of the laser pulse width.

As described above, in order to avoid damage to the optical system of the exposure device and improve the resolution, it has been required to ensure a long pulse generation of the laser pulse width $T_{is}$. It is well known in the art that the laser pulse width $T_{is}$ is dependent on the fluorine gas concentration in the laser gas enclosed in the laser chamber (see Proc. SPIE Vol.3679 (1999) pp. 1030 to 1037 mentioned above) and so the concentration of fluorine gas is adjusted to enable the laser pulse width $T_{is}$ to attain a long pulse generation with $T_{is} \geq 30$ ns.

In recent years, there has been a demand for a high repetition rate with regard to the ArF excimer laser device which is strongly demanded as a light source for next-generation semiconductor exposure applications in order to accomplish a high through-put during exposure processing. The present inventor has developed an ArF excimer laser device for exposure which can be operated with a repetition rate of more than 3 kHz in order to serve the mentioned demand.

The concentration of fluorine gas in the laser gas enclosed in the laser chamber was changed in order to attain a laser pulse width $T_{is}$ satisfying the relation of $T_{is} \geq 30$ ns. As long as the repetition rate did not exceed 2 kHz, the long pulse generation could be attained by adjusting the concentration of fluorine gas in the laser gas to attain a relation of $T_{is} \geq 30$ ns. However, in the case that the repetition rate exceeded 2 kHz (for example, 3 kHz), whatever concentration of fluorine gas in the laser gas was used, it was not possible to attain a long pulse generation fulfilling the relation of $T_{is} \geq 30$ ns.

SUMMARY OF THE INVENTION

The present invention has been invented in view of the problems of the prior art, and it is an object of the invention to provide an ArF excimer laser device for exposure in which the laser pulse width is 30 ns or more even in case the repetition rate exceeds 3 kHz.

The present inventor particularly investigated the argon gas in gases constituting the laser gas enclosed in the laser chamber, and, as a result of continuous investigations, discovered that when the ArF excimer laser device is operated with a repetition rate of 3 kHz or more, the laser pulse width $T_{is}$ is dependent on the concentration of the argon gas.

In addition, it has been found that in the case of repetition rates of 2 kHz or less, the laser pulse width $T_{is}$ is not dependent on the concentration of argon gas.

The repetition rate in the prior art ArF excimer laser devices usually available on the market was mainly 1 kHz and the repetition rate realized by the ArF excimer laser devices available in research institutes was about 2 kHz. Due to this fact, as described above, the dependency of the argon gas concentration on the laser pulse width $T_{is}$ was not discovered resulting in that only the concentration of fluorine gas was adjusted.

The present inventor discovered that, contrary to the prior art approach, a laser pulse width $T_{is}$ of at least 30 ns could be realized with a repetition rate exceeding 3 kHz by employing a new approach of adjusting the concentration of argon gas.

That is, the ArF excimer laser device for exposure of the present invention which achieves the aforesaid object is comprised of a laser chamber filled with a laser gas composed of fluorine gas, argon gas and at least one rare gas other than argon gas and a high voltage pulse generating device for generating a high voltage pulse electrical discharge within the laser chamber, exciting said laser gas and discharging laser beams so as to perform a quickly repeated oscillating operation of more than 3 kHz. The laser operation is carried out in a half-period for starting an electrical discharge oscillating current waveform of a pulse of reversed polarity generated by said high voltage pulse generating device and at least two subsequent half-periods. The pressure of the laser gas in the laser chamber is 2.5 to 3.5 atm; the fluorine concentration of the laser gas is at most 0.12%; and the argon gas concentration of said laser gas is from 2% to 3%.

As regards the percentages given in connection with the gas concentrations, if not stated otherwise, these are generally in vol.-%.

In addition, it is preferred that the rare gas other than argon gas is a gas mixture containing neon gas and xenon gas, the concentration of xenon gas being 5 to 15 ppm.

In the present invention, a laser operation is carried out in an initial half-period of an electrical discharge oscillating current waveform of a pulse of reversed polarity generated by the high voltage pulse generating device and in at least two subsequent half-periods. The pressure of the laser gas in the laser chamber is 2.5 to 3.5 atm, the fluorine concentration of the laser gas is 0.12% or less, and the argon gas concentration in the laser gas is between 2% and 3%. As a result, it is possible to realize an ArF excimer laser device for exposure with a laser pulse width $T_{is}$ of 30 ns or more, even if the repetition rate is 3 kHz or more. Here, the concentration of argon gas is the partial pressure of the argon gas relative to the pressure within the laser chamber.

As apparent from the foregoing description, the ArF excimer laser device of the present invention is constituted such that the laser operation is carried out in the first half period of the electrical discharge oscillating current waveform of a pulse having a reversed polarity generated by the high voltage pulse generating device and in two subsequent half-periods, wherein the pressure of the laser gas in the laser chamber is set to 2.5 to 3.5 atm, the fluorine concentration of the laser gas is 0.12% or less and the argon gas concentration of the laser gas is 3% or less, whereby it is possible to realize an ArF excimer laser device for exposure with a laser pulse width $T_{is}$ of 30 ns or more, even if the repetition rate is 3 kHz or more.

In addition, if the argon gas concentration is 2% or more, it is possible to set the energy per pulse to a value higher than 5 mJ, which is desirable in view of the performance of the exposure device and the performance of the resist coated onto a wafer.

Further, if the rare gas other than argon gas is a gas mixture containing neon gas and xenon gas, and the xenon gas concentration is 5 to 15 ppm, it is possible to expand the range of argon gas concentration to where the laser output energy per pulse is at least 5 mJ.

DETAILED DESCRIPTION OF THE INVENTION

Referring now to a preferred embodiment of the present invention, an ArF excimer laser device for optical exposure will be described.

Figure 1:
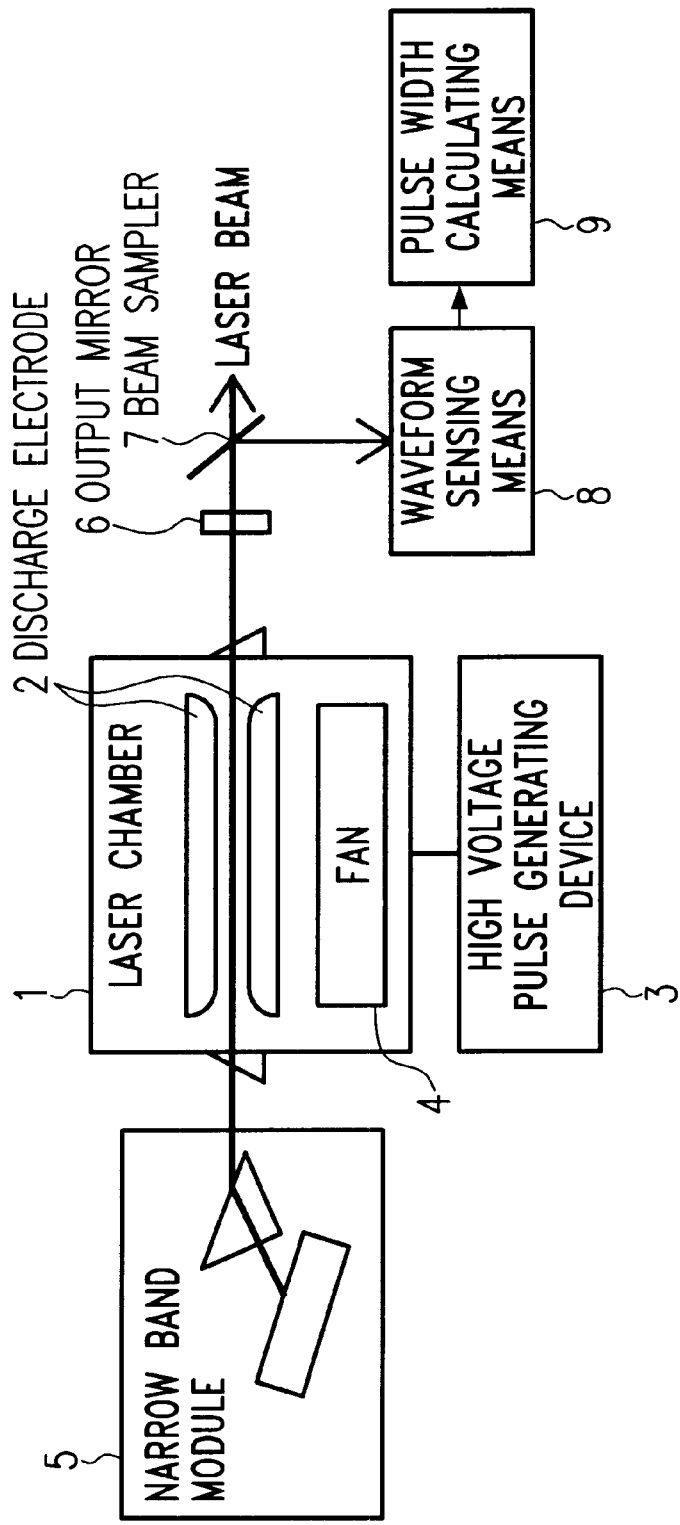
FIG. 1 is a schematic diagram illustrating an example of the constitution of the ArF excimer laser device of the present invention.

FIG. 1 illustrates an example of the constitution of the ArF excimer laser device for optical exposure of the present invention. In this figure, a laser chamber 1 is provided with windows at both ends, and a laser gas composed of a gas mixture comprised of fluorine gas, argon gas and a buffer gas (for example, neon gas) is encapsulated in this chamber.

A pair of opposed discharge electrodes 2 are arranged spaced apart by a predetermined distance within the laser chamber 1. A high voltage pulse is applied from a high voltage pulse generator 3 to generate an electrical discharge between the discharge electrodes 2, whereby the laser gas, as the laser medium, is excited.

A fan 4 is installed within the laser chamber 1, and with which the laser gas is circulated within the laser chamber 1. Since, due to this circulation of the laser gas, the laser gas between the discharge electrodes 2 is replaced by fresh gas after a first electrical discharge and before a subsequent electrical discharge is generated, the subsequent electrical discharge is stable. The present inventor improved the laser gas circulation means of the laser chamber 1 and the shape of the fan 4, and so on, and realized a repetition rate of 3 kHz or more.

An end part of the laser chamber 1 is provided with a narrow band module 5 having a narrow band optical system for generating a narrow band of the spectral width of the laser beam. The narrow band forming optical system is constituted, for example, by a beam diameter enlargement optical system comprised of at least one prism and a retro-type arranged reflective-type refraction grating. The other end of the laser chamber 1 is provided with an output mirror 6. The laser resonator is defined by this output mirror 6 and the narrow band forming optical system installed in the narrow band module 5.

A part of the ArF excimer laser light emitted through the output mirror 6 is branched off by a beam splitter 7 and guided to a waveform sensing means 8 for measuring the time-dependent waveform of the laser beam. The waveform sensing means 8 is provided with a photodiode or a photomultiplier, for example, as an opto-electronic conversion means. The waveform data attained by the waveform sensing means 8 is sent to a pulse width calculation means 9. The pulse width calculation means 9 calculates the laser pulse width $T_{is}$ in accordance with the equation (1), above, in response to the pulse width data received.

Figure 2:
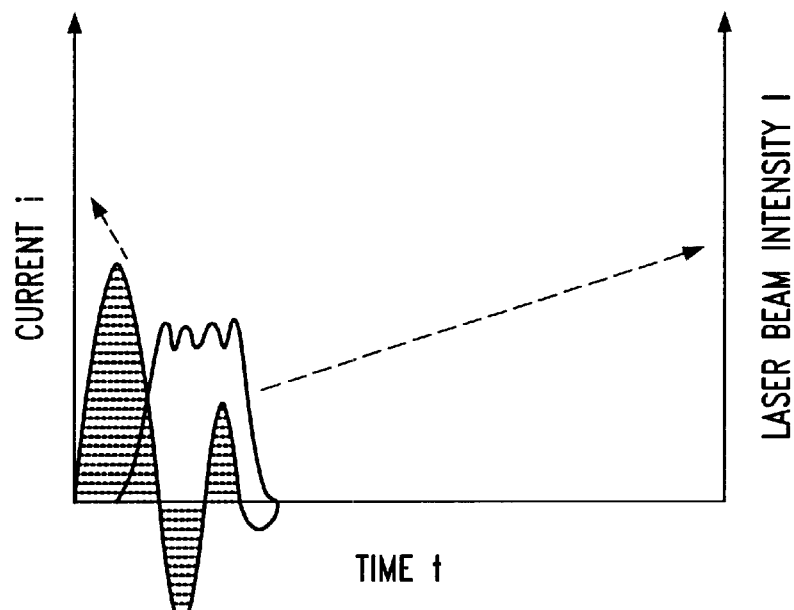
FIG. 2 is graph of the relationship between the oscillating electrical discharge current and a laser operation of the ArF excimer laser device of the present invention.

In the present invention, a long pulse generation is realized by optimizing the circuit constant of the high voltage pulse generator so as to shorten the period of the oscillating current and increase the peak value of the oscillating current between the discharge electrodes. That is, as shown in the waveform in FIG. 2, a long pulse generation is attained by optimizing the circuit constant of the high voltage pulse generator so as to shorten the period of the oscillating current and increase the peak value of the oscillating current. By this measure, the laser gas is excited in an initial ½ period of the oscillating current as well as in at least two following ½ periods, and the laser operation is carried out continuously.

In the ArF excimer laser device shown in FIG. 1, the relation between the laser pulse width $T_{is}$ and the argon gas concentration within the laser chamber 1 and the laser output energy per 1 pulse was investigated while keeping the repetition rate at 3 kHz, the pressure within the laser chamber 1 at 3.5 atm (approximately 350 kPa), the fluorine concentration at 0.09% and using neon as the buffer gas. This yielded the results shown in FIG. 3.

Figure 3:
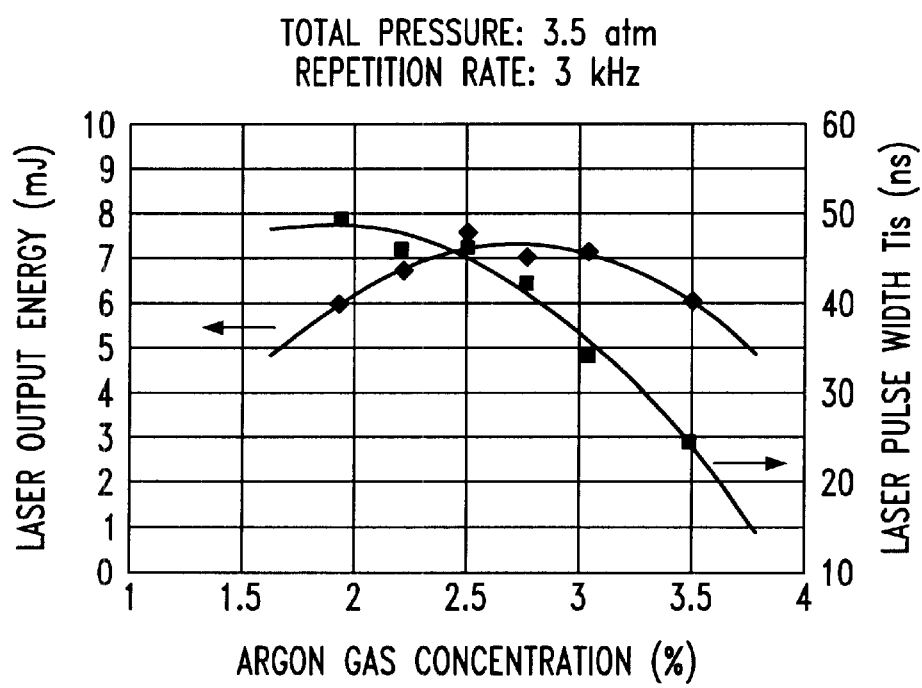
FIG. 3 is a graph showing the relation between the laser pulse width and the argon gas concentration within the laser chamber, and the laser output energy per pulse for a pressure in the laser chamber of 3.5 atm.

As apparent from the results shown in FIG. 3, in the case that the repetition rate is 3 kHz and the pressure of the laser gas within the laser chamber is 3.5 atm, when the argon gas concentration is increased the laser pulse width $T_{is}$ is shortened. The reason for this phenomenon is that, if the repetition rate is increased to 3 kHz or more, the electrical discharge becomes unstable by an occurrence of residual discharge products such as Ar ions and by an occurrence of a current concentration caused by the ionization of Ar. A spatial concentration of the electrical discharge occurs from a uniform electrical discharge in the latter half segment of the pulse excitation to prevent the required uniform excitation from being efficiently carried out. Accordingly, in order to attain a laser pulse width $T_{is}$ ($T_{is} \geq 30$ ns) of 30 ns or more, it is necessary to set the argon concentration to 3% or less. Further, the pressure within the laser chamber 1 corresponds to a value attained when the gas temperature is 25° C.

With reference to the results shown in FIG. 3, it is apparent that when the argon gas concentration is decreased, the laser output energy is also decreased. The reason why this phenomenon occurs is that, with the argon gas concentration being decreased, the amount of excimers to be excited is reduced. Since the energy of the beam per pulse discharged by the narrow band ArF excimer laser device for exposure is, preferably, about 5 mJ in view of the performance of the exposure device and the performance of resist coated on the wafer, if the argon concentration becomes less than 2%, the laser pulse width $T_{is}$ in the case shown in FIG. 3, is still $T_{is} \geq 30$ ns, however, the energy per pulse falls below 5 mJ. Accordingly, it is desirable that the argon gas concentration within the laser chamber 1 is set to 2% or more. Further, in the case shown in FIG. 3, if the argon gas concentration is exceeds about 3%, the laser output energy starts to decrease. The reason why this phenomenon occurs is that, when the argon gas concentration is increased as described above, the laser pulse width $T_{is}$ becomes short.

Figure 4A:
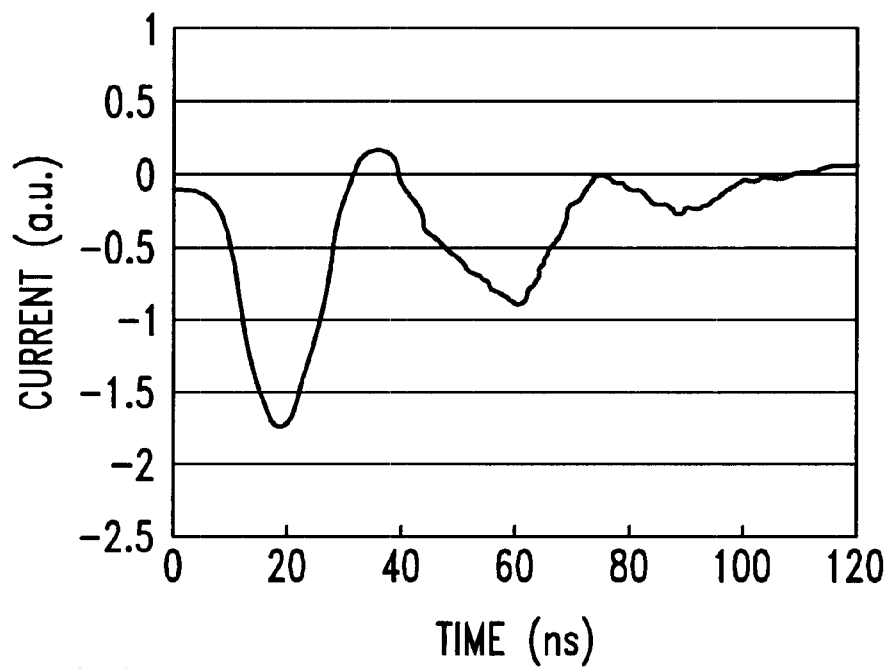
FIG. 4(a) is a graph of the electrical discharge current flowing between discharge electrodes over the time.
Figure 4B:
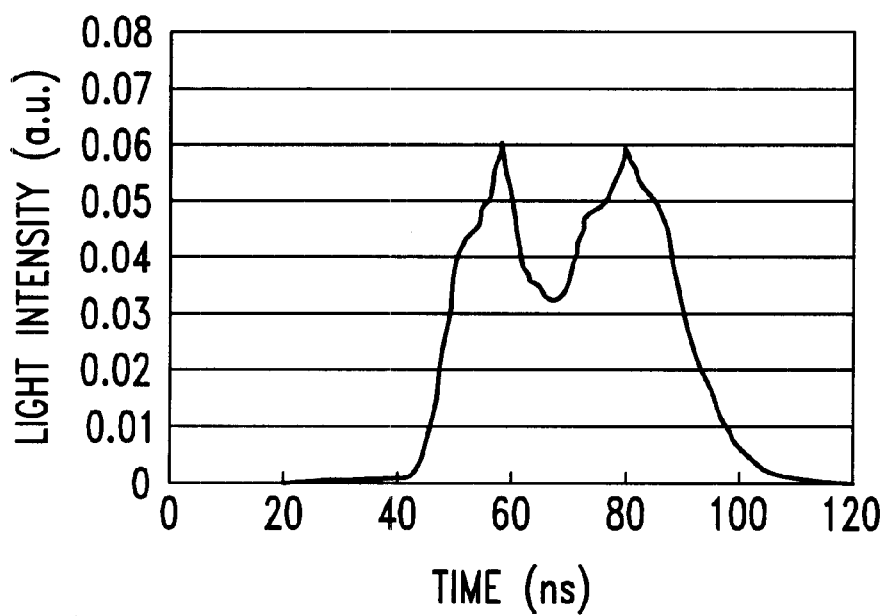
FIG. 4(b) is a graph of a curve of the light intensity of a laser pulse measured with a waveform sensing means versus time for one example of the present invention.

FIG. 4(a) and FIG. 4(b) show an example in which the electrical discharge current flowing between the discharge electrodes 2 (FIG. 4(a)) and the time-dependent laser pulse waveform measured with the waveform sensing means 8 (FIG. 4(b)) are compared to each other when the argon gas concentration within the laser chamber 1 is set to 2.5% under the aforesaid conditions. In this example, the value of the laser pulse width $T_{is}$ calculated by the pulse width calculating means 9 was 46 ns.

The result shown in FIG. 4 indicates that the laser gas is excited in the first ½ period of the oscillating current flowing between the discharge electrodes 2 while an electrical discharge is performed and the subsequent two ½ periods (in particular, the excitation is carried out in the first ½ period and the third ½ period) and the argon gas concentration is set to 2.5% (being 3% or less) to attain a long pulse generation with $T_{is}$ being approximately 46 ns.

Figure 5:
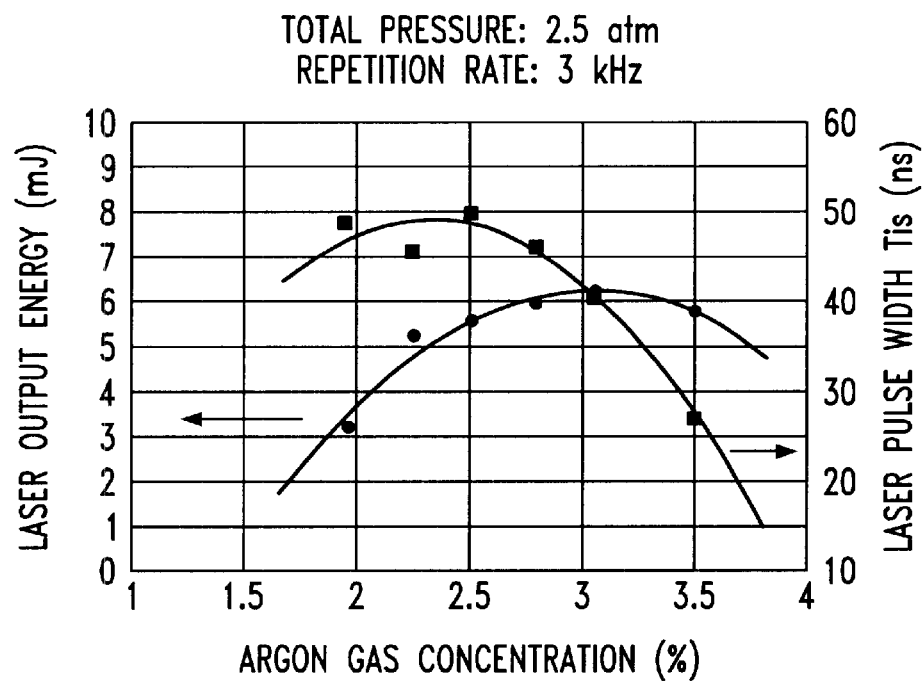
FIG. 5 is a graph of the relationship between laser pulse width and the laser output energy per pulse versus the argon gas concentration in the laser chamber in the case that the pressure within the laser chamber is 2.5 atm.

FIG. 5 indicates the results obtained when investigating the relation between the laser pulse width $T_{is}$ and the argon gas concentration within the laser chamber 1 and the laser output energy per pulse under conditions for the repetition rate, the fluorine concentration and buffer gas which correspond to those indicated with reference to FIG. 3. Only the pressure within the laser chamber 1 is set to 2.5 atm (approximately 250 kPa). It has been found that, when the argon gas concentration is set to be 3% or less, even under this condition, the laser pulse width $T_{is}$ can be set to fulfill the relation of $T_{is} \geq 30$ ns.

Further, in the case that the argon gas concentration is between 2 and 3%, it is desirable that the pressure within the laser chamber 1 is about 2.5 to 3.5 atm (approximately 300 to 400 kPa). The reason why this value is set as described above is that it is hard to set the energy per pulse to a value of 5 mJ or more when the pressure within the laser chamber 1 is lower than 2.5 atm, and in turn, if the pressure within the laser chamber 1 exceeds 3.5 atm, the impedance within the electrical discharge region is increased so that the discharge state can hardly be maintained and a stable electrical discharge excitation for a long period of time becomes difficult, so that, consequently, a laser pulse width $T_{is}$ of $\geq 30$ ns cannot be attained.

In addition, it is desirable that the fluorine gas concentration is 0.12% or less. The reason is that, if the fluorine gas concentration is higher than 0.12%, the fluorine attaches electrons and causes a non-uniform electron density distribution within the laser gas even if the argon concentration is set to be less than 3%. As a result, a laser pulse width $T_{is}$ with $T_{is} \geq 30$ ns cannot be realized.

Figure 6:
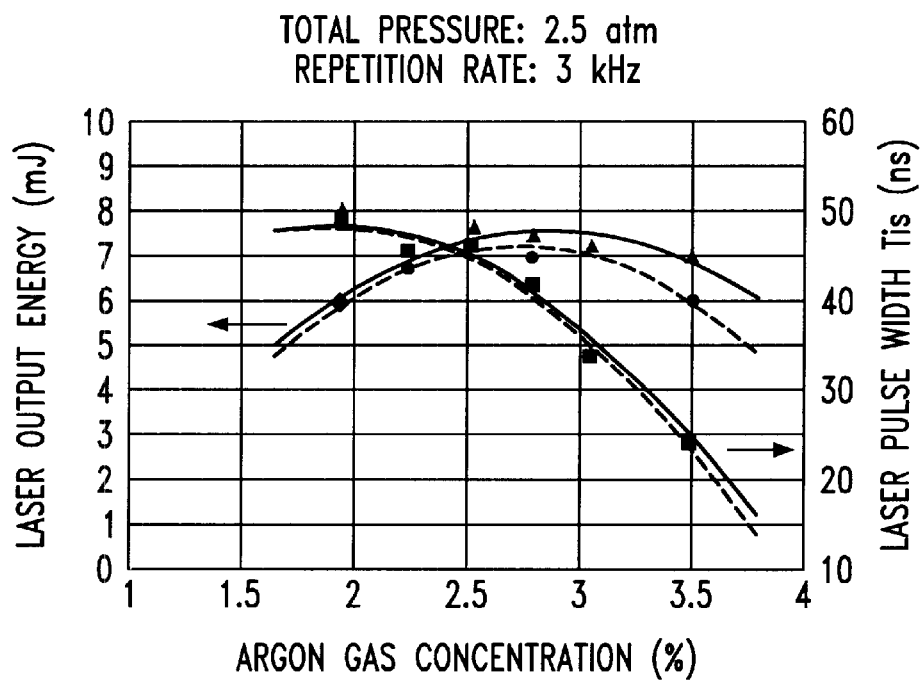
FIG. 6 is a graph of the relationship between laser pulse width and the laser output energy per pulse versus the argon gas concentration in the case that xenon gas is added in the laser chamber.

Further, although an example was described in which neon is applied as the buffer gas in the preferred embodiment, the present invention is not limited to the use of this gas, inert gases other than neon being usable in the mixture. FIG. 6 indicates the result of investigating the relation between the laser pulse width $T_{is}$ and the laser output energy per pulse with reference to the argon gas concentration within the laser chamber 1 under a condition in which xenon (Xe) is added at 10 ppm in addition to neon as the buffer gas. The repetition rate is 3 kHz, the pressure within the laser chamber 1 is 3.5 atm (approximately 350 kPa) and the fluorine concentration is 0.09%. For sake of comparison, the results shown in FIG. 3 having only neon as the buffer gas are also indicated (by a dotted line) in FIG. 6.

Although the relation between the argon gas concentration and the laser pulse width $T_{is}$ has scarcely changed through addition of the xenon gas at 10 ppm, the laser output energy per pulse is increased as compared with the case when xenon was not added. Action of this added xenon aims to promote the pre-ionization caused by ultraviolet radiation produced from the preliminary discharge electrodes (not shown) arranged near the electrical discharge space between the discharge electrodes within the laser chamber 1. In this way, addition of xenon to the buffer gas causes an expansion of the argon gas concentration range in which the laser output energy per pulse is not lower than the 5 mJ desired with regard to the exposure conditions in the exposure device and the photoresist and the like.

In this case, it is desired that the concentration of xenon gas to be added is in a range of 5 to 15 ppm. The reason why this value is set to this range is that the experiments performed by the present inventor showed that, if the concentration of xenon gas is set to be lower than 5 ppm, there is hardly any effect on increasing the laser output energy per pulse, and in turn, if the xenon gas concentration is increased to more than 15 ppm, the laser output energy per pulse is decreased to lower than 5 mJ.

As described above, regarding the present invention, the present inventor succeeded in realizing a narrow band ArF excimer laser device for long pulse generation with high repetition rates in which the repetition rate is 3 kHz or more and the laser pulse width $T_{is}$ is 30 ns or more by application of a new technology wherein the argon gas concentration is varied, contrary to the prior art wherein the fluorine concentration was adjusted within the laser chamber.

Although the ArF excimer laser device for exposure of the present invention has been described with reference to some preferred embodiments, the present invention is not limited to these preferred embodiments, but various kinds of modifications can be realized. For example, in the case that the energy of the laser beam per pulse emitted by the narrow band ArF excimer laser device for exposure is lower than 5 mJ due to the improved performance of the exposure device and the improved performance of the resist coated on a wafer, it is possible correspondingly to expand the set range of the argon gas concentration within the laser chamber over the lower limit of 2%. Briefly, it is satisfactory to merely chose the argon gas concentration relative to the required laser pulse width $T_{is}$ and the laser output energy per pulse.

I claim:

1. An ArF excimer laser comprising a laser chamber filled with laser gases composed of fluorine gas, argon gas and at least one rare gas other than argon gas and a high voltage pulse generating device which generates pulses within the laser chamber of reversed polarity having an electrical discharge oscillating current waveform for exciting said laser gas and acting in conjunction with an optical system for discharging a series of laser beams so as to perform an oscillating current waveform laser operation with a repetition rate of more than 3 kHz;

wherein, to produce a laser pulse with a width of at least 30 ns;

the laser operation is carried out in a start half-period of the electrical discharge oscillating current waveform of the pulses generated by said high voltage pulse generating device and in at least two subsequent half-periods;

a pressure of said laser gas in the laser chamber is from 2.5 to 3.5 atm;

a concentration of the fluorine in said laser gas is 0.12% or less of the volume of the laser gas; and a concentration of the argon gas in said laser gas is from 2% to 3% as a partial pressure of the argon gas relative to the pressure of the laser gas in the laser chamber.

2. An ArF excimer laser device for exposure according to claim 1, wherein the rare gas other than argon gas is a gas mixture containing neon gas and xenon gas.

3. An ArF excimer laser device for exposure according to claim 2, wherein a concentration of said xenon gas is 5 to 15 ppm.

* * * * *